Figure 1:
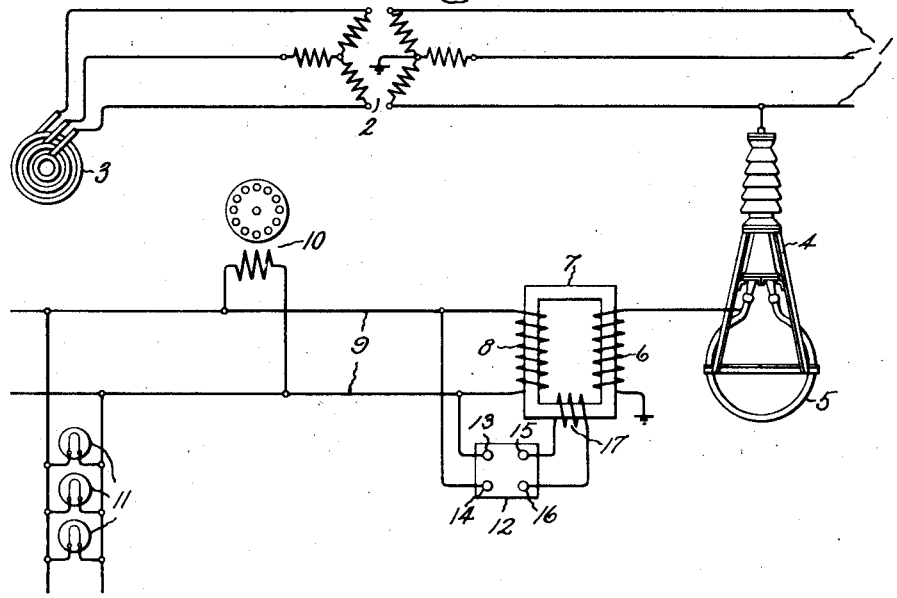

July 28, 1931.   T. A. E. BELT   1,816,717
ELECTRICAL DISTRIBUTION SYSTEM
Filed March 27, 1930

Inventor:
Thomas A. E. Belt,
by Charles E. Mullen
His Attorney.

Patented July 28, 1931

1,816,717

UNITED STATES PATENT OFFICE

THOMAS A. E. BELT, OF SCHENECTADY, NEW YORK, ASSIGNOR TO GENERAL ELECTRIC COMPANY, A CORPORATION OF NEW YORK

ELECTRICAL DISTRIBUTION SYSTEM

Application filed March 27, 1930. Serial No. 439,487.

My invention relates to electrical distribution systems and particularly to improvements in systems for the economical interconnection of high voltage power transmission lines and low voltage load circuits.

The problem of providing a cheap way of tapping high voltage power transmission lines in order to supply with energy therefrom relatively small low voltage loads, such as farms or groups of farms located along the routes of such lines, has received the increasing consideration of many members of the electrical industry of recent years because of the increasing demands of such potential rural consumers for service at reasonable rates.

Perhaps the simplest and most obvious way of stepping down the voltage of the high voltage line is through the direct use of a step down transformer. However, a transformer which is capable of reducing present day long distance transmission line voltage, two hundred and twenty kilovolts for example, direcly to one hundred and ten volts, the voltage at which most domestic appliances are rated, is a relatively large and expensive piece of apparatus. Furthermore, the cost per kilowatt capacity of such a transformer is higher for small capacity sizes than for large capacity sizes because the insulation requirements are the same in each case and also because the ratio of the losses to the output is greater in small capacity transformers than in large ones, thus producing a lower efficiency in the former. The result is that the cost of supplying only a few kilowatts by such a method has up to the present been so high as to preclude its adoption to any considerable extent.

Another way of stepping down the voltage is by means of electrostatic condensers, which may either step the voltage down directly to the required load voltage or which may be combined with a transformer to step the voltage down to that of the primary winding of the transformer. Such arrangements have the advantage that the losses in the condensers are very small thus making for a system of high efficiency, which as previously pointed out is an important consideration if the rates for service to rural consumers are to be comparable to those for urban consumers.

One of the difficulties of the condenser method is the design of a condenser having the necessary mechanical strength and reliability coupled with the requisite cheapness of construction.

Another difficulty encountered with the condenser method is its extremely poor inherent voltage regulation, due to the series reactance which the load current must traverse. In order to overcome this various schemes have been adopted to provide improved regulation. These schemes have heretofore been either resonance schemes in which the equivalent reactance through which the load current passes is neutralized or else schemes in which an inherently variable reactance is used to provide compensatory changes in the reactance of the equivalent circuit with changes in load current. The former scheme, while theoretically capable of perfect regulation is subject to the excessive currents and voltages to which resonant circuits are sometimes subject. The latter scheme while safer than the former does not have a very wide range of satisfactory operation.

As perhaps the bulk of the small rural loads will be incandescent lamps and as it is well known that the voltage limits for the proper operation of such lamps are exceedingly close it will be apparent that the voltage regulation of any system for tapping high voltage lines must be very good. Consequently and in accordance with my invention I provide regulating means associated with such a system which is operative in response to the load voltage of said system.

The object of my invention is to provide a new and improved system for obtaining relatively small low voltage powers from high voltage transmission lines.

Another object of my invention is to provide new and improved voltage regulating means for association with a voltage reducing system which interconnects a high voltage circuit and a low voltage circuit.

My invention will be better understood from the following description taken in connection with the accompanying drawing and its scope will be pointed out in the appended claims.

Figure 2:
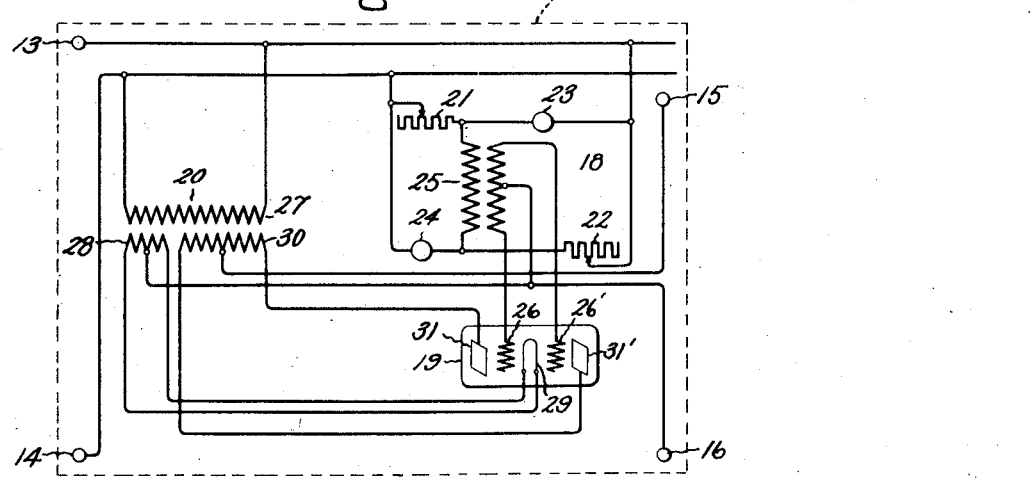

In the drawings, Fig. 1 is a diagrammatic showing of a preferred embodiment of my invention, while Fig. 2 shows diagrammatically the details of a preferred type of regulator for use with my invention.

Referring now to Fig. 1, 1 represents a high voltage alternating current power transmission line from which it is desired to obtain relatively small powers at low voltage. This line is energized through a step up transformer 2 by an alternator 3. The neutral point of the secondary winding of transformer 2 is preferably grounded, as is the usual practice.

For stepping down the line voltage to a value which can be applied to the load devices that consume the power which is tapped I provide a capacitive reactance 4 and a step down, iron core transformer 7. As shown, I prefer to connect the capacitor and the primary winding 6 of transformer 7 between one of the conductors of line 1 and ground, because the voltage between them is less than that between the conductors of the line itself, thus allowing the use of a smaller capacitive reactance, or step down transformer, or both. However, it should be understood that I might equally well connect the capacitor and transformer between line conductors without departing from my invention in its broader aspects.

Capacitor 4 is preferably an oil filled cable type coupling capacitor, such as is described and claimed in my prior Patent No. 1,731,884 which is assigned to the same assignee as this application. Such a capacitor comprises essentially a loop of oil filled metal sheath cable 5 which when used in my system has its core connected to one of the conductors of line 1 and its sheath connected to ground through the primary winding 6 of transformer 7. Thus the core and sheath form the plates of a condenser having a dielectric of oil.

A load circuit 9 is connected to the secondary winding 8 of transformer 7, this circuit supplying any suitable load devices such as an induction motor 10 and incandescent lamps 11.

As the voltage regulation of the system as described thus far would be poor, due to the variations in the impedance drop through the capacitor and transformer with variations in load, and as most rural loads will probably include many incandescent lamps which require a substantially constant voltage for economical operation, I provide a regulating means 12, which has terminals 13 and 14 connected across load circuit 9 so that the variations in voltage thereof will cause the regulator to vary the excitation of a saturating winding 17 on transformer 7, this winding being connected to terminals 15 and 16 of regulator 12.

The details of a preferred form of regulator are shown in Fig. 2. This regulator comprises three main elements, namely, a voltage determining device 18, a grid controlled full wave rectifier valve 19 of the electric discharge type whose grids are controlled by the voltage determining device 18, and a transformer 20 for supplying filament and plate current for valve 19. I refer to element 19 as an electric discharge device because I wish by this expression to include gaseous or arc discharge devices as well as the usual high vacuum substantially pure electron discharge devices.

The voltage determining element 18 comprises four impedances shown as a pair of adjustable resistances 21 and 22, which have a substantially zero temperature resistance coefficient, and a pair of resistances 23 and 24 having either positive or negative temperature resistance coefficients, such as a pair of ballast lamps which have positive temperature-resistance coefficients, connected in the form of a bridge across terminals 13 and 14. A transformer 25 is connected across the midpoints of the bridge, the terminals of the secondary winding thereof being connected to the grids of valve 19. Transformer 20 has its primary winding 27 connected across terminals 13 and 14. One secondary winding 28 of this transformer supplies current for filament 29 of valve 19, while the other secondary winding 30 supplies the proper voltage to plates 31 and 31' of valve 19. The midpoint of winding 30 is connected to terminal 15 while terminal 16 is connected to the midpoint of the secondary winding of transformer 25 and the midpoint of the winding 28.

The operation of my system is as follows. Assume that alternator 3 is operating in the usual manner to energize transformer 2 and consequently line 1. The voltage across the primary winding of transformer 7 will then be the vector difference between the voltage to ground of the line and the voltage drop in capacitor 4 and as the relative impedance of the capacitor and transformer may be made almost any value desired through suitable design, and as the ratio of transformation of transformer 7 may be practically any value desired, a cheap, standard ratio transformer may be employed to give a secondary winding voltage of the required amount, the necessary primary winding voltage being secured through the use of a capacitor of the proper impedance. Load devices 10 and 11 may therefore draw power through circuit 9 from transformer 7. However, as previously pointed out the comparatively poor voltage regulation of such a system is not conducive to its satisfactory operation. Consequently I employ a regulator which is very sensitive to variations in voltage of load circuit 9.

The operation of this regulator is such that if the voltage of circuit 9 falls, as through an increase in load thereon, the energization of saturating coil 17 will be decreased thereby increasing the reactance of the transformer 7 whereby it takes a greater portion of the voltage drop between the line and ground, or describing the action of the regulator in another way, the decrease in energization of the saturating winding results in the core of the transformer being operated at a lower point on its magnetization curve, so that the wave of the exciting current produces greater changes in flux in the core and hence a greater induced voltage in the secondary winding, thus counteracting the tendency of the voltage to fall. In a similar manner increases in voltage on circuit 9 cause the regulator to increase the energization of coil 17.

In order that the regulator may operate in this manner, bridge 18 is adjusted, through adjustment of resistances 21 and 22, until the voltage across transformer 25 is zero at normal voltage for circuit 9. The voltages of the grids 26 and 26' with respect to filament 29 will consequently be zero at this time.

If now the voltage of circuit 9 should decrease, the decreased current flow through the arms of the bridge will result in resistance changes in ballast lamps 23 and 24, thereby unbalancing the bridge and producing a voltage across the terminals of the primary winding of transformer 25. The ratio of transformation of this transformer may be made very great so that a very small voltage across its primary winding produces a large voltage across its secondary winding. In this way the regulator may be made as sensitive as desired. Assume now that at a particular instant the plate 31 is positive with respect to filament 29 and that the unbalancing of bridge 18 has caused grid 26 to become negative with respect to filament 29. The result will be that the grid bias thus produced reduces the current flow between filament 29 and plate 31 and consequently the flow of current through coil 17 which is connected across these elements. A half cycle later plate 31' will be positive with respect to filament 29 while the polarity of grid 26' with respect to filament 29 will also be negative, thus reducing the current in coil 17 during this half of the wave.

Similarly, an increase in voltage of circuit 9 will unbalance the bridge in the other direction, so to speak, causing grids 26 and 26' to become positive with respect to filament 29 at times when the polarity of plates 31 and 31' are positive with respect to the filament, thereby to increase the current flow in saturating coil 17.

If only single wave rectification is desired, one grid and plate may obviously be omitted. Also it may happen that in some installations the positive grid bias which may at times be necessary to secure proper regulation will cause undue heating of discharge device 19. In such a case it will be obvious to those skilled in the art that the system may be so adjusted that for normal voltage the grid should normally have a certain negative bias, which may readily be obtained by connecting suitable sources of direct current potential, such as grid bias batteries, in the grid circuits, without departing from my invention in its broader aspects.

It will be seen that I have provided a regulated distribution system for use in connection with high voltage power transmission lines, in which the regulating means has not moving parts and which may be made as sensitive as desired.

While I have shown and described a particular embodiment of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, a high voltage alternating current power transmission circuit, a condenser, a step down transformer, means connecting said condenser and the primary winding of said transformer in series between different potential points of said line, a low voltage load circuit connected to the secondary winding of said transformer, load devices connected thereto, and means connected to be responsive to the voltage of said load circuit for regulating its voltage by varying the relative impedance of said condenser and said transformer.

2. In a system of distribution, in combination, a source of alternating current, a power transmission circuit, a transformer connected between said source and said circuit for stepping up the voltage of the former to the proper value for economical long distance transmission, a condenser, a step down transformer, means connecting said condenser and the primary winding of said transformer in series across a voltage of said transmission circuit, a low voltage load circuit connected to the secondary winding of said step down transformer, and means for regulating the voltage of said load circuit through control of the saturation of said step down transformer.

3. In a system of distribution, in combination, a source of alternating current, a power transmission circuit, a transformer connected between said source and said circuit for stepping up the voltage of the former to the proper value for economical long distance transmission, a condenser, a step down transformer, means connecting said condenser and the primary winding of said transformer in series across a voltage of said transmission circuit, a low voltage circuit connected to the secondary winding of said step down transformer, and means responsive to the voltage of said low voltage circuit for regulating said voltage through control of the saturation of said step down transformer.

4. In combination, a high voltage alternating current power transmission circuit, a condenser, an iron core step down transformer having a primary winding, a secondary winding and a saturating winding, means connecting said condenser and said primary winding in series across a voltage of said power transmission circuit, a load circuit connected to said secondary winding, and means responsive to changes in voltage of said load circuit for supplying said saturating winding with rectified current from said circuit in amounts sufficient to maintain substantially constant voltage on said circuit.

5. In a system of distribution, in combination, a source of alternating current electrical energy, a high voltage power transmission circuit, a step up transformer connected between said source and said circuit, the secondary winding of said step up transformer being star connected, means grounding the midpoint of said secondary winding, means for tapping small powers from said line to be delivered at the voltage for which standard domestic load appliances are rated comprising a capacitor and a step down iron core transformer, said capacitor and the primary winding of said transformer being connected in series between one of the conductors of said line and ground, load devices connected to the secondary winding of said transformer, means for regulating the voltage of the secondary winding of said transformer comprising means connected to said secondary winding for producing a voltage which varies in proportion to variations in the voltage of said secondary winding from a predetermined value, a grid controlled electric discharge device, means for energizing the grid of said device, a source of plate potential, and a saturating winding on said step down transformer connected in the plate circuit of said device, and amplifying means connecting said voltage producing means between the filament and grid of said device.

In witness whereof, I have hereunto set my hand this 26th day of March, 1930.

THOMAS A. E. BELT.